United States Patent [19]

Wroblewski

[11] Patent Number: 4,965,550
[45] Date of Patent: Oct. 23, 1990

[54] AUTOMATIC WAKE-UP CIRCUIT ARRANGEMENT FOR A SINGLE WIRE MULTIPLEX SWITCH MONITORING SYSTEM

[75] Inventor: Thomas R. Wroblewski, Sterling Heights, Mich.

[73] Assignee: Chrysler Corporation, Highland Park, Mich.

[21] Appl. No.: 429,114

[22] Filed: Oct. 30, 1989

[51] Int. Cl.$^5$ .............................................. G08B 25/00
[52] U.S. Cl. .................................... 340/524; 340/518; 340/525; 340/459; 340/461; 364/431.11; 371/29.1
[58] Field of Search ............... 340/524, 525, 505, 518, 340/459, 461, 825.08, 825.1, 825.15; 364/431.11, 424.1, 550, 551.01; 371/15.1, 16.5, 29.1

[56] References Cited

U.S. PATENT DOCUMENTS 3,927,404 12/1975 Cooper .................................. 340/518
4,677,308 6/1987 Wroblewski et al. ............... 340/459
4,839,530 6/1989 Greenwood ......................... 340/459

Primary Examiner—Donnie L. Crosland
Attorney, Agent, or Firm—Wendell K. Fredericks

[57] ABSTRACT

Continuous status monitoring of a plurality of switches and smart sensors associated with the switches, wherein each sensor is connected to a separate single point in a single wire bus is affected by a smart sensor multiplex arrangement employing an automatic wake-up circuit. The automatic wake-up circuit allows activation of any switch of a group of high priority switches to automatically take a microcontroller out of a wait mode and causes it to go into a POWER-ON mode. In the POWER-ON mode, power routes all circuits in the entire system and then a polling of all the switches and sensor modules is performed.

4 Claims, 4 Drawing Sheets

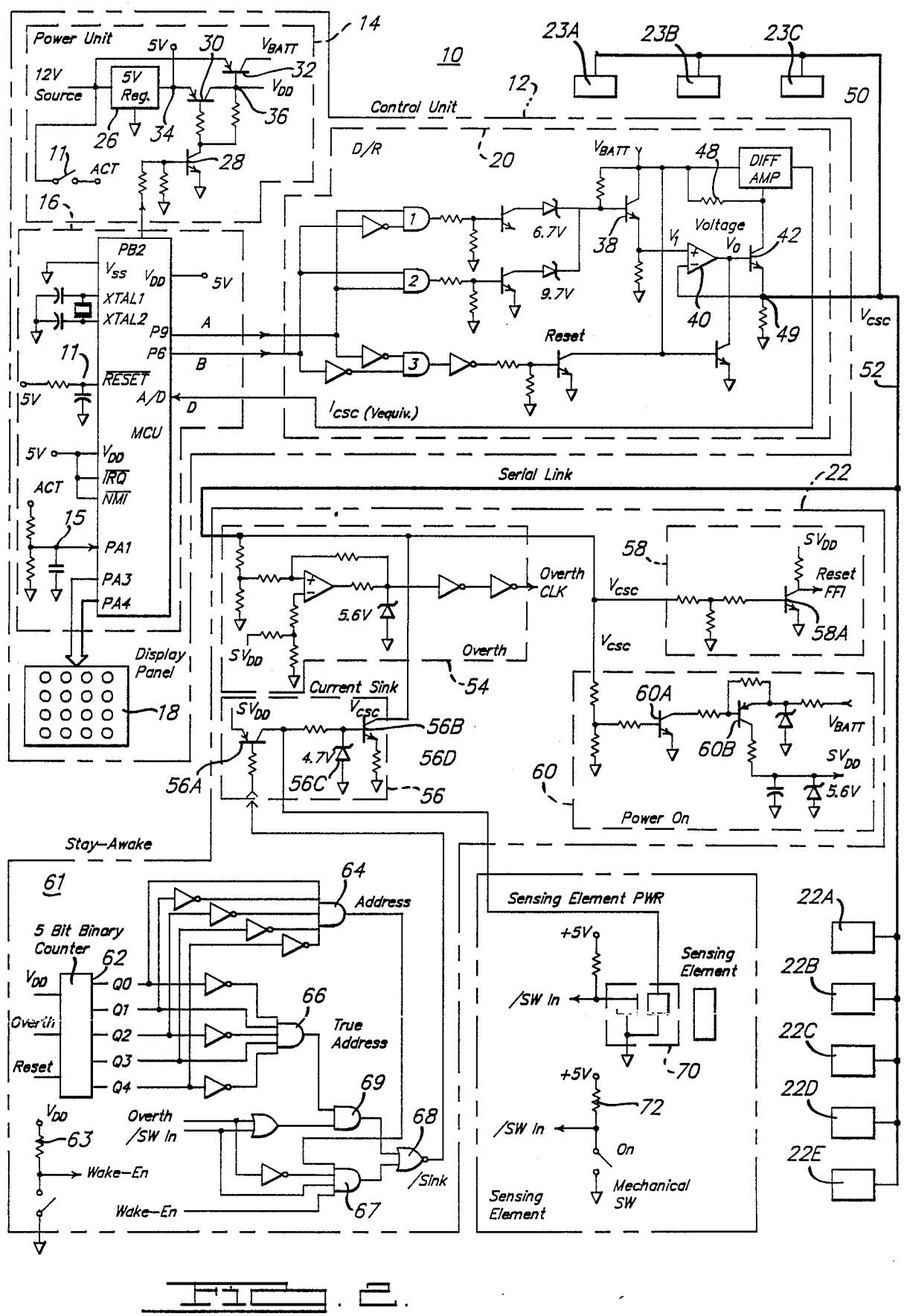

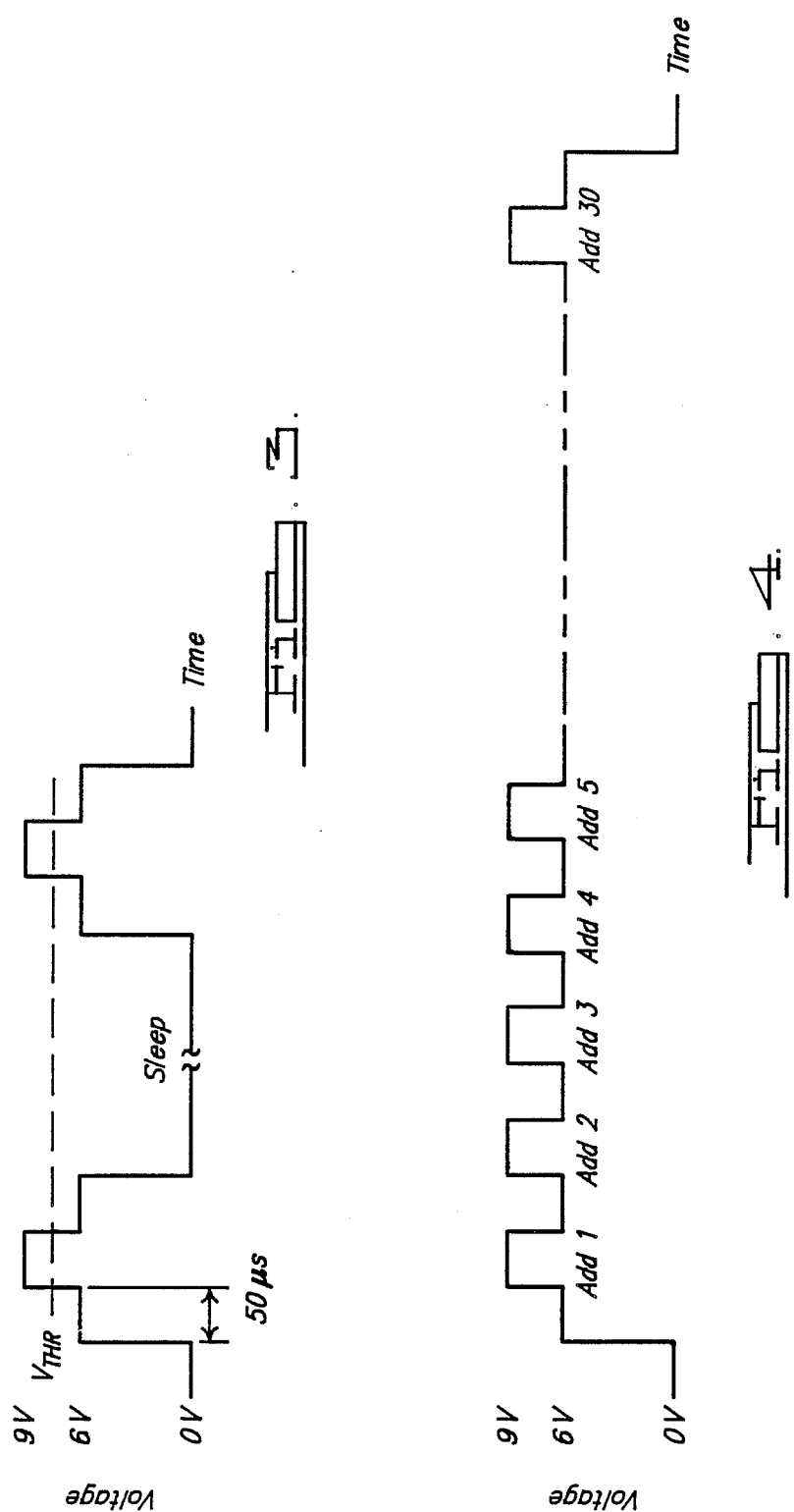

AUTOMATIC WAKE-UP CIRCUIT ARRANGEMENT FOR A SINGLE WIRE MULTIPLEX SWITCH MONITORING SYSTEM

BACKGROUND OF THE INVENTION

1. Field of the Invention

This invention relates to a wake-up system multiplexing technique for obtaining status of a plurality of switches, disposed at remote locations of a monitored region, and connected to a controller by a single wire bus and more particularly to an automatic wake-up system which turns on the controller in responses to actuations of any one of a chosen number of high priority switches.

2. Description of the Prior Art

Switch monitoring systems normally operate after an operator initiates a POWER-ON switch to start a POWER-ON sequence in a computer or microcontroller. A problem exists when a need occurs for the system to self-initiate the POWER-ON sequence of the computer.

In an effort to develop a system that would automatically wake-up and initiate a multiplex monitoring operation of a plurality of switches, a search was initiated for a scheme that uses several high priority switches which, if activated, would wake-up a microcontroller and cause multiplex monitoring of all the remaining switches connected to the single wire bus. That search resulted in the automatic wake-up circuit of the present invention.

BRIEF SUMMARY OF THE INVENTION

The present invention concerns an automatic system wake-up scheme involving a microcontroller that wakes up out of a wait or standby mode and proceeds to cause power to route to components in a switch monitoring system. The system uses a group of high priority switches or a manual power switch to initiate the wake-up process of the microcontroller. While awake, the microcontroller addresses a plurality of smart sensor modules, each of which connects to a switch. The sensor modules connected to the high priority switches contain special wake-up circuits that respond to a special address pulse that emanates from the microcontroller during a chosen interval while in the standby mode. When the system wakes up, all the switches, i.e., the high as well as the low priority switches, are monitored.

BRIEF DESCRIPTION OF THE DRAWINGS

FIG. 2 illustrates in partial block, partial schematic diagram the switch monitoring system of FIG. 1;

FIG. 3 depicts a waveform/address code used by a microcontroller to detect activated high priority switches used to initiate automatic wake-up of the system;

FIG. 4 depicts a waveform of address codes used to poll all the switches when the system wakes up.

DETAILED DESCRIPTION OF A PREFERRED EMBODIMENT

Figure 1:
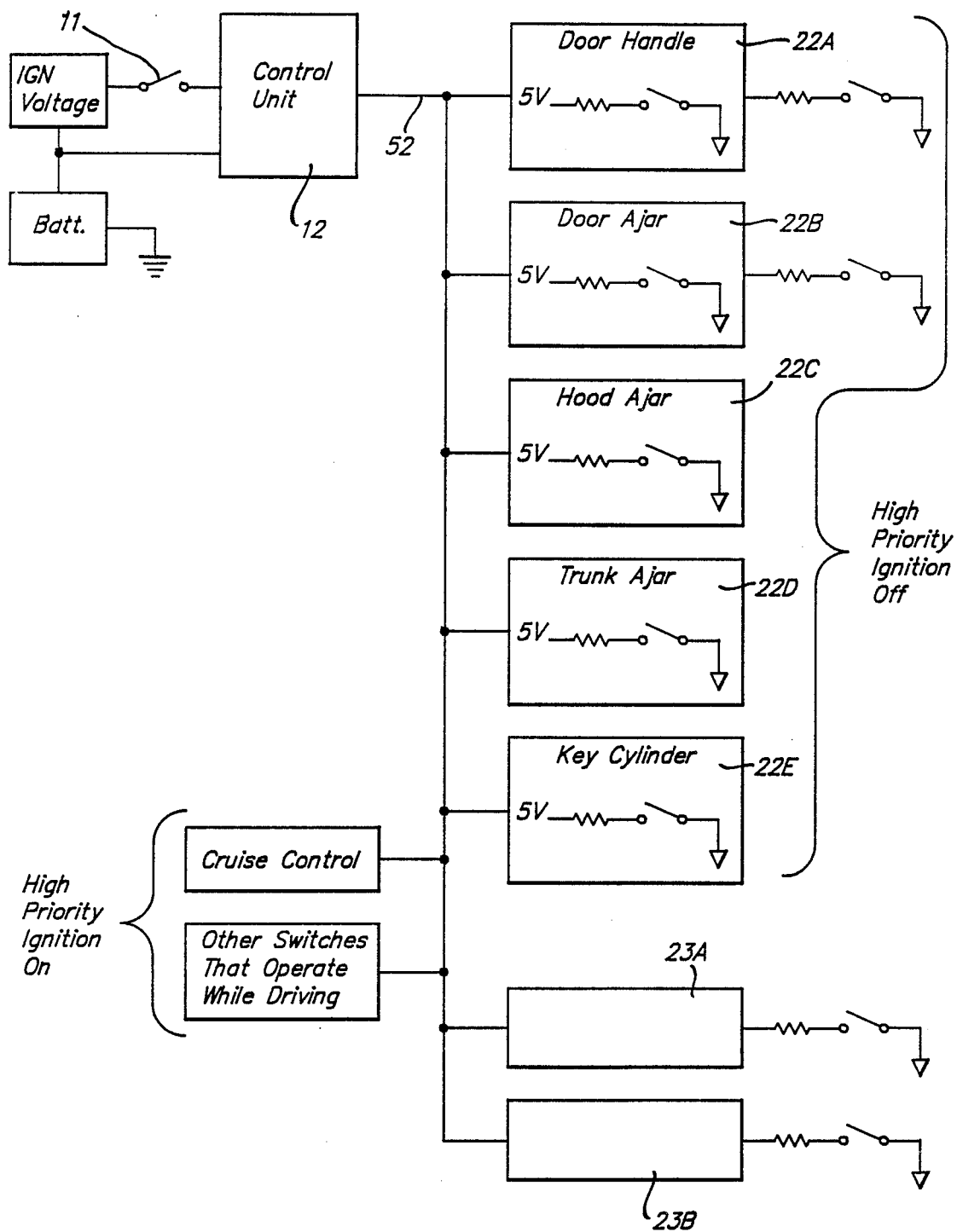
FIG. 1 illustrates a block diagram of an automatic wake-up circuit arrangement for a single wire bus multiplex switch monitoring system.

FIG. 1 depicts the automatic wake-up system 10. The system consists of a control unit 12, a single wire bus or serial link 52 and a series of high priority smart sensor modules 22A-22E and a series of low priority smart switch sensor modules 23A-23B. With the source voltage or ignition off, the high priority sensor modules have the capability of awaking the system and initiating a polling of all the switches, both the high priority as well as the low priority switches.

The initial conditions for system 10 places battery power to control unit 12 but the ignition voltage is held off by activation voltage (ACT) switch 11 until activated by an operator.

Each high priority sensor module 22A-22E includes a wake-up circuit. The high priority sensor module monitors the operation of a normally closed switch which, when the serial bus 52 is activated, will produce a 5-volt clamped signal within the sensor module. The low priority sensor modules 23A-23B will also connect to normally closed single pole, single throw switches but will not contain a wake-up circuit.

With reference now to FIG. 2, there is shown a partial block, partial schematic diagram of the preferred embodiment of a automatic wake-up system 10 for a single wire bus multiplex switch monitoring system. FIG. 2 depicts control unit 12 which includes power unit 14 and a microcontroller (MCU) 16 and a schematic diagram of a single high priority smart switch sensor module 22 and a series of other high priority sensor modules 22A-22E in block diagram form connected to a serial link or bus 52 along with a series of low priority sensor modules 23A-23C shown in block diagram form.

Initially, a 12 volt source such as a battery supplies 12 volts to a 5 volt regulator 26 of power unit 14. The 5 volt regulator 26 generates a regulated 5 volts DC which routes to MCU 16 to initiate a POWER-ON mode.

During the POWER-ON mode, a timing system within MCU 16 (not shown) activates, and an internal oscillator (also not shown) turns on and stabilizes. An integrator or delay circuit 11 connected to the output of regulator 26 provides a delayed signal to a /reset terminal of MCU 16 to provide a delay signal which holds the /reset terminal LOW and, after the delay the /reset signal goes HIGH and then MCU 16 starts executing a factory installed initialization program stored in ROM. (The /symbol represents a NOT logic function.)

MCU 16, illustratively, a signal chip unit such as a Motorola MC68HC05B6 microcontroller unit contains a CPU, an internal timing system, a ROM, a RAM, an EEPROM and input/output ports. Ports A and B provide input/output lines and port D provides an input to an internal A/D converter.

After initialization of registers and memories in MCU 16, and in accordance with the main program, an input port is read to sense the presence of the ignition voltage; i.e., whether the operator has turned on the ignition switch 11. If the ignition is OFF, MCU 16 executes a wait mode operation which includes an interrupt of the timing system every, illustratively, ⅛ of a second. The interrupt causes MCU 16 to place a high logic signal at port PB2 which activates the power unit 14.

POWER UNIT OPERATION

When PB2 goes HIGH, $V_{batt}$ and $V_{dd}$ power are provided to system 10. The logic HIGH from PB2 routes to the base of transistor 28 causing it to conduct which, in turn, places a near ground potential at the base of PNP transistors 30 and 32. When transistor 30 conducts, the 5 volt regulated voltage routes to junction 36 providing switched $V_{dd}$ to MCU 16. When transistor 32 conducts, the 12 V source voltage routes to the $V_{batt}$ terminal providing 12 volts DC to the system.

After activating power unit 12, in accordance with the main program, MCU 16 generates logic signals from port A and B to form a first address pulse which passes over the serial link 52 as a bus voltage $V_{csc}$ signal. FIG. 3 depicts this first address pulse.

The first address pulse is generated if the ACT switch 11 is OFF and the main program causes MCU 16 to execute a wait mode instruction which causes the first address pulse to generate. This first address pulse placed on serial link 52 comprises four states; namely, an OFF state, a first 6 volt state (high priority switch sensors become active), a 9 volt state (wake-up address Q0 detected) and a second 6 volt state (MCU reads wake-up address).

To generate these various states, the logic circuitry in a driver/receiver circuit (D/R) 20 of FIG. 2 produces the several levels of voltage signals. The zero state occurs when both A and B input lines from MCU 16 go LOW; 6 volt state occurs when the A input goes HIGH and the B input goes LOW and the 9 volt state occurs when both A and B input lines go HIGH. Each state is enabled for 500 microseconds and after the transition from the 9 volt state down to the 6 volt state, MCU 16 reads the A/D input to determine whether or not a current signal has been sent over serial link 52 from the sensor module back to D/R 20 due to a switch closing causing a high priority sensor module to initiate the current signal.

SENSOR MODULE OPERATION

A sensor module activates if it: (1) senses the first address placed on the serial link 52; (2) contains a wake enable (wake-en) circuit; and (3) a sensing element or a sensing switch associated with it activates. If a wake-en signal along with the switch-in signal (this signal generates when a high-priority switch activates) occurs simultaneously with the first address, then the sensor module 22 sends the current signal over serial link 52 back to D/R 20 during trailing edge 6 volt portion of the first address. D/R 20, in turn, sends a voltage equivalent signal to the A/D input of MCU 16 to indicate that MCU 16 should stay awake and should poll all 30 addresses of switches. This is done to determine which of the high priority sensing switches has been activated while the ACT switch 11 is OFF.

To accomplish this, all circuits of the sensor module 22 utilizes the leading edge of the $V_{csc}$ pulse.

The POWER-ON circuit 60 activates to apply $V_{csc}$ (6 or 9 volts) to the circuits in the sensor module. This switched $V_{csc}$ DC signal is referred to as $SV_{dd}$. As the $V_{csc}$ signal goes through the transition from 0 to 6 volts, NPN transistor 60A conducts causing the base PNP transistor 60B to be biased on which, in turn, transfers $V_{csc}$ to the collector circuit of transistor 60B. A 5.6 volt zener diode limits the $V_{csc}$ voltage to approximately 5 volts forming the $SV_{dd}$ signal.

After the generation of the $SV_{dd}$ signal, the leading edge of the $V_{csc}$ signal provides a base bias voltage signal to NPN transistor 58A causing a logic low reset output signal to generate. This reset signal resets a 5 bit binary counter 62 in the stay-awake circuit 61 in sensor module 22.

Also during the transfer of the first address pulse, counter 62 counts to 1; that is, the output Q0 goes HIGH while the outputs Q1 through Q4 goes LOW. This status of counter 62 causes AND gate 64 to provide a logic 1 at one of the inputs of AND gate 67. If the sensor module 22 includes the wake-en circuit 63 and that circuit has been activated; that is, to provide a HIGH logic wake-en signal and the sensing element 70 or mechanical switch 72 associated with the sensor module is activated or at a logic HIGH level, then the output of AND gate 67 will go HIGH causing the output of NOR gate 68 to go LOW generating a /sink signal.

The /sink signal routes to the current sink circuit 56 and applies a low base bias current signal that turns on a PNP transistor 56A. The $SV_{dd}$ voltage applied to the emitter of transistor 56A routes to the base of an NPN transistor 56B but is limited to approximately 4.7 volts by 4.7 volts zener diode 56C. The base voltage on transistor 56B causes it to conduct; the conduction of transistor 56B pulls the serial link 52 LOW to a current level dictated by a resistor 56D which is tied to ground.

This increased current on serial link 52 routes to junction 49 in D/R 20. Transistor 42 in D/R 20 is turned on by the base voltage which mirrors the voltage at the non-inverting terminal of voltage follower 40. Hence, the collector current of transistor 42 becomes substantially the same as the current at junction 49. Hence, the voltage across the resistor 48 at the input of the differential amp of 50 becomes the difference between the collector voltage of transistor 42 and $V_{batt}$. The output of differential amplifier 50 provides an analog voltage signal to the A/D input of MCU 16 which permits MCU 16 to read the status of the addressed sensor module. This status is displayed by MCU 16 on display panel 18.

With reference again to FIG. 1, any one of the sensor modules 22A through 22E would respond in the manner described supra. If the sensor modules 22A through 22E are not sensing a sensing element or a mechanical switch, then the first address as depicted in FIG. 3 would terminate and MCU 16 will go back to sleep.

Within another ⅛ of a second, MCU 16 would again wake-up and issue a first address and monitor via the A/D input the high priority sensor modules 22A through 22E while ACT switch 11 is OFF to determine whether or not any of the sensor modules connected to a mechanical switch or to a sensing element has been activated.

If MCU 16 detects a high priority sensor module, while ACT switch 11 is OFF, that is connected to an activated sensing element or an activated mechanical switch, then MCU 16 executes a program which causes the polling of all 30 switches including the low priority switches. This first complete polling cycle is primarily conducted to determine which of the high priority switches have been activated. MCU 16 determines this by noting that if none of the high priority switches are activated when the ACT switch 11 is OFF, then the voltage signal sent back to the A/D input would represent a current of approximately two milliamps. If one of the high priority sensor modules has sensed an activated mechanical switch or sensing element, then the voltage at the A/D input would represent a 15 milliamp current on the serial link.

OPERATION OF THE SYSTEM

Figure 5:
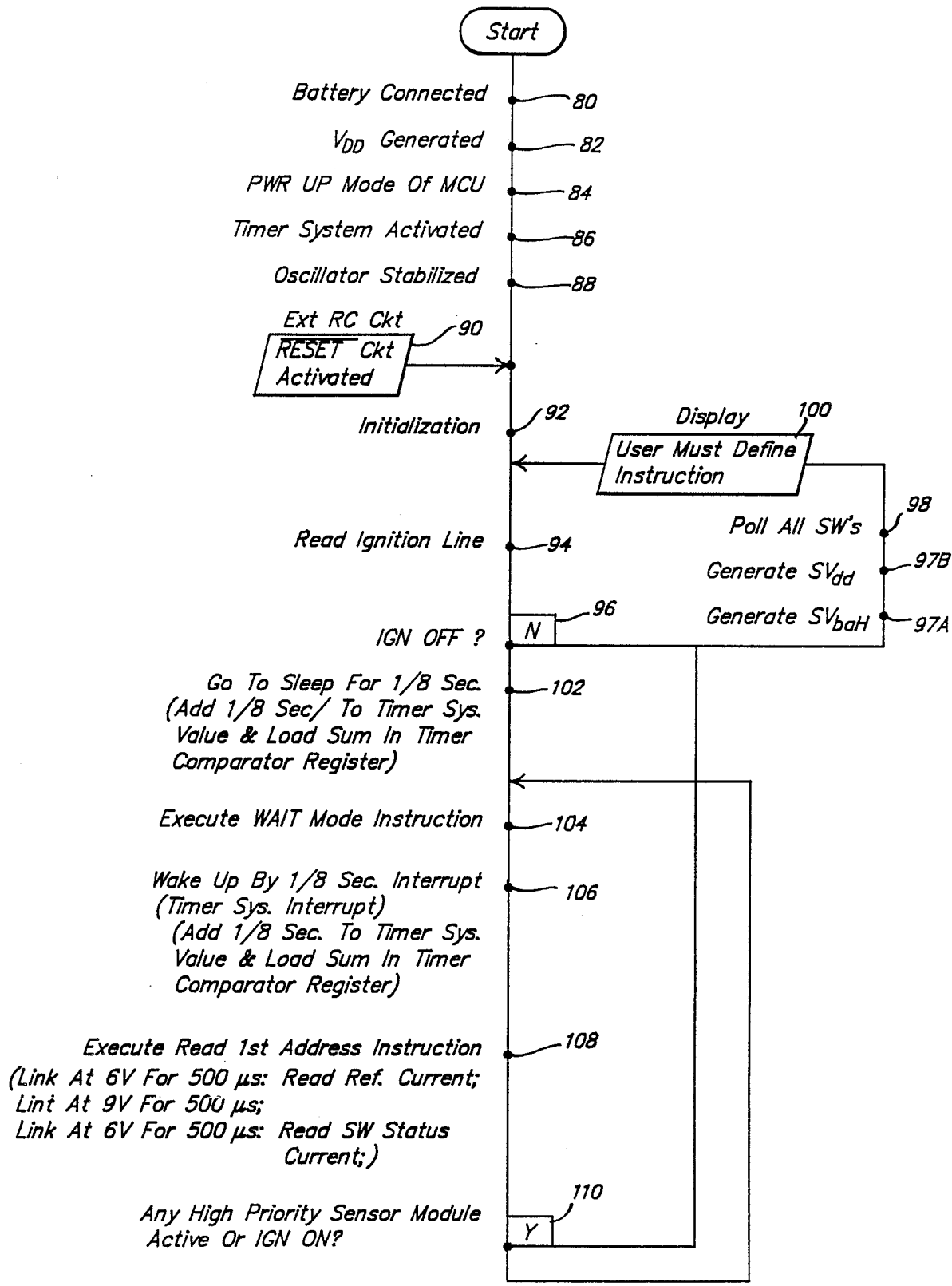
FIG. 5 illustrates in flowchart form the program routine used by the microcontroller of this invention to effect the automatic wake-up and the polling of switches.

To relate the operation of MCU 16 of FIG. 2 with D/R 20 and the high priority sensor modules 22-22E, reference is now made to FIG. 5, a flowchart of the program executed by MCU 16. Before describing the flowchart, some comments are in order.

The flowchart diagram of FIG. 5 differs from the conventional box and diamond flowchart. In FIG. 5, the flow of control passes along the lines and proceeds down the page. Conventional start up of program and end of program symbols are used. Actions are signified by a small circle or dot on the lines with the description of the action being given to the left or right flow lines. Actions only take place on vertical lines. When a decision has to be introduced, the flow line branches to the right or left. The branch may be caused by either a yes or no condition, this being signified by a Y or N in a box as indicated. Where secondary flow rejoins the main flow, an arrowhead is used. The conventional trapezoid is used to indicate input or output operations. A reference number will indicate the point along the line being discussed.

In FIG. 5, a 12 volt source is connected to the power unit 14 of the system (dot 80). A 5 volt regulator 26 in power unit 14 converts the 12 volt source voltage into a 5 volt regulator voltage for use throughout the control unit 12. The regulator 5 volts DC routes to the $V_{dd}$ input of MCU 16 for generating power (dot 82).

This $V_{dd}$ power is used during a power up mode of MCU 16 (dot 84). In this mode, a timer system in MCU 16 is activated and an oscillator for the system is stabilized as indicated (dots 86 and 88 respectively).

The 5 volt regulated voltage is also applied to a RC circuit 11 which activates a /reset circuit (input operation box 90). After the reset operation, MCU 16 executes a small start-up program which sets all CPU registers with correct values and clears all information in the computer memory to 0 before accepting information from D/R 20. This is called initializing the registers (dot 92).

Following initialization, MCU 16, reads an input port PA1 (dot 94) to determine whether or not the system has been manually operated; illustratively, the ignition has been turned on; e.g., in a car, or a POWER-ON switch button to a monitoring system has been operated.

As indicated at decision box 96, MCU 16 makes a decision as to whether or not the ACT switch 11 is OFF and if it determines that it is OFF, the program in MCU 16 moves to the operation at dot 102. If the ACT switch 11 is not OFF, then MCU 16 places a logic one signal at PA2 to cause the power unit 14 to generate both the switch battery voltage ($S_{batt}$) and $SV_{dd}$ voltages for powering D/R 20.

The power applied to D/R 20, MCU 16 generates suitable logic signals at port A and B which routes to D/R 20 to generate an off-set type square wave, first address signal over serial link 52 as shown in FIG. 3. This operation of generating $V_{csc}$ is depicted at dots 97A and 97B of FIG. 5.

The $V_{csc}$ signal travels over serial link 52 to each of the sensor modules in the system. If a sensing element or mechanical switch has been activated, then MCU 16 will stay awake and poll all switches (dot 98) and the various current signals placed on link 52 will return to MCU 16. MCU 16 will interpret them and provide a display of the results on display panel 18 so that the user may interpret the various result (output block 100).

If at decision block 96, the ACT switch 11 is found OFF, the program will cause MCU 16 to proceed to the operation at dot 102. As indicated at dot 102, MCU 16 will go to sleep for illustratively ⅛ of a second and this time will be added to the timer system value and sum is loaded in the timer comparator register.

As indicated at dot 104, MCU 16 executes a wait mode instruction. Then MCU 16 wakes up by a ⅛ second interrupt and again ⅛ second is added to the timer system value and the sum is loaded in the timer comparator register (dot 106).

After being awakened, MCU 16 reads the first address instruction (dot 108). During this period, MCU 16 generates a logic signal over lines A and B to cause the $V_{csc}$ signal on link 52 to go to six volts for 500 microseconds and, during this first 500 microseconds, MCU 16 reads the current and establishes a reference current. During the next 500 microseconds, MCU 16 causes the signal link 52 to go to 9 volts for 500 microseconds. At the end of the second 500 microsecond period, MCU 16 causes the serial link to go back to 6 volts for 500 microseconds. During this 500 microsecond period, MCU 16 reads the mechanical switch or the sensing element switch status by reading the voltage corresponding to the return current sent over serial link 52 at the A/D input.

As indicated at decision box 110, MCU 16 determines if any high priority sensor modules were activated or ACT switch 11 turned ON. MCU 16 would know whether or not this action occurs during the first address if it reads, illustratively, 15 ma. rather than 2 ma. If it does read the high priority sensor modules; i.e. 15 ma., then MCU 16 is instructed to go to operation dots 97A-98 and poll all switches and then proceed to the next operation at dot 100. If no high priority switches are detected, then MCU 16 is instructed to revert back to the operation at dot 104 and re-execute the wait mode instructions.

It is to be understood that the above-described embodiment is mainly illustrative of the principles of the present invention. Although a discrete embodiment is disclosed, an integrated embodiment equivalent could be developed. One skilled in the art may make changes and modifications to the embodiments disclosed herein and may devise other embodiments without departing from the scope and essential characteristics thereof.

We claim:

1. A single-wire serial link multiplex switch monitoring system containing a wake-up circuit arrangement for automatically monitoring a plurality of individual switches disposed throughout chosen locations of a monitored region, each of said switches having one end of a series-resistor sensing element connected to a moving switch element of said switches, said system comprising:
    (a) a power and signal bi-directional single wire bus means, said bus means being routed throughout the monitored region near each of said plurality of switches;
    (b) a first and a second group of smart switch sensor means disposed throughout the monitored region, each of said sensor means having means for forming a first connection across the series-resistor sensing element for each of said plurality of switches, and another means for forming a second connection across said bus means and a ground terminal, each of said switch sensor means having circuit means for providing current signals which route to said bus means, each of said current signal means placing a current signal on said bus means during a predetermined time slot of a given polling cycle of said sensor means, said current signals being indicative of a status of said moving switch element of said switches and of said sensor associated with the predetermined time slot, each of said first group of smart switch sensor means having a stay-awake circuit means connected to said series-resistor sensing element of a high priority switch, said high priority switch and said stay awake circuit means providing a current signal on said bus means for waking up said system from a standby or wait condition;

(c) a driver and receiver means connected single-ended across a ground terminal and a terminating end of said single-wire bus means for generating power and voltage signals in the form of an offset, square-wave, pulse-train signal comprising a succession of coded-pulse signals superimposed over an offset-voltage signal, said coded-pulse signals providing a series of address codes for addressing said plurality of switches disposed at the remote locations during a POWER-ON condition, said pulse train being driven onto to said bus means from said driver and receiver circuit means, said first group of sensor means being connected to said bus means so as to receive said pulse train and to use a plurality of "states" of a first address pulse of said pulse train to awake said system from a wait or standby condition if one of said high priority switches has been activated, the awaking of said system causing a polling of both said first and second groups of sensor means, the polling also being initiated if said system is manually activated by a manual switch means used to apply power to said system, said polling of each sensor means being so that each of said plurality of sensor means are addressed in sequence and then allotted individual predetermined time on said bus means, the addressing of each sensor means and the allotment of time on said bus means being performed in a chosen sequential manner, the sequential manner forming the polling cycle of said sensor means, the polling of each sensor being at a chosen polling cycle rate, said driver and receiver circuit means also having means for receiving, interpreting and then converting said current signals sent over said bus means by an addressed first or second group sensor means into voltage signals indicative of the status of said addressed senor means and its associated switch;

(d) display means for displaying the status of each of said first and second groups of sensor means and said associated switches;

(e) a regulated voltage means having an input terminal connected to an unregulated voltage source and producing therefrom an immediate regulated voltage signal at a first output terminal, a first and a second delayed regulated voltage signal at a second and a third output terminal in response to a control signal indicative that one of the high priority switches or said manual switch means had been activated; and (f) microcontroller means having a first input terminal connected to said first output terminal of said regulated voltage means for providing power to a wait mode circuit within said microcontroller means, a second input terminal connected to said manual switch means for causing said microcontroller means to leave said WAIT mode and to start operating in a POWER-ON mode and a third input terminal connected to an output terminal of said driver and receiver circuit means that provides voltage signals indicative of the current signals placed on said bus means during the POWER-ON mode of said microcontroller means for reading voltage signals from said driver and receiver circuit means indicative of the status of each of said addressed sensor means and its associated switch, for causing the microcontroller means to go from the "WAIT" mode to the "POWER-ON" mode when one of the high priority switches or said manual switch means had been activated and for establishing a history of performance of each of said addressed sensor means, at least a pair of output terminals interconnecting said drive and receiver circuit means and said display means for writing voltage and clock signals to said driver and receiver circuit means that controls the generation of each pulse of the offset square wave voltage pulse train including the plurality of "states", a bus output terminal for transferring updated independent sensor means and switch data indicative of the status of said sensor means and said switches to said display means during each polling cycle and during each wake-up operation and a logic output terminal for routing control signals to said regulated voltage means.

2. Apparatus in accordance with claim 1 wherein said microcontroller means includes means connected to said second input terminal for sensing the activation of said manual switch means and producing therefrom, if said manual switch has been activated, a logic signal at said third output terminal that routes to a logic input terminal of said regulated voltage means to cause said regulated voltage means to provide a POWER-ON mode voltage signal to said microcontroller means and a source voltage signal to said driver and receiver circuit means, said POWER-ON voltage signal causing logic signal generation means connected to said pair of output terminals for transferring logic signals to said driver and receiver circuit means for generating said coded pulse signals used to address all said switch sensor means connected to said bus means in order to poll said plurality of switches.

3. Apparatus in accordance with claim 2 wherein said microcontroller means includes timing means connected to said pair of output terminals for transferring logic signals to said driver and receiver circuit means when said manual switch is not activated to cause a first address pulse to issue from said driver and receiver circuit means and travel over said bus means to said first group of smart sensors means for causing any of said first group of sensor means, connected to an activated switch, to place a current signal on said bus which said driver and receiver means could sense and then convert to a voltage signal that routes to said logic output terminal, said microcontroller means also including means connected to said pair of output terminals for generating said pulse train used to poll all of said plurality of switches disposed at the remote locations.

4. Apparatus in accordance with claim 4 wherein each sensor means of said first group of sensor means connected to said high priority switches has means connected to said bus means and means connected to an associated high priority switch for reading the first address pulse signal and for reading the occurrence of the activation of the high priority switch respectively, and producing therefrom at an output terminal a current signal that routes over said bus means back to said driver and receiver means, wherein said driver and receiver means converts said current signal into a voltage signal and then routes the voltage signal to said third input terminal of said microcontroller means to cause said microcontroller means to go from the "WAIT" mode to the "POWER-ON" mode which wakes up said switch monitoring system.

* * * * *